(No Model.)

E. P. BENNETT.
ICE CAGE FOR WATER COOLERS.

No. 387,037.  Patented July 31, 1888.

WITNESSES:
Th. Rollé.
James F. Kelly

INVENTOR:
Edwin P. Bennett
BY Wiederscheim & Kinston
ATTORNEYS.

UNITED STATES PATENT OFFICE.

EDWIN P. BENNETT, OF PHILADELPHIA, PENNSYLVANIA.

ICE-CAGE FOR WATER-COOLERS.

SPECIFICATION forming part of Letters Patent No. 387,037, dated July 31, 1888.

Application filed August 20, 1887. Serial No. 247,468. (No model.)

*To all whom it may concern:*

Be it known that I, EDWIN P. BENNETT, a citizen of the United States, residing in the city and county of Philadelphia, State of Pennsylvania, have invented a new and useful Improvement in Ice-Cages for Water-Coolers, which improvement is fully set forth in the following specification and accompanying drawings.

My invention relates to improvements in ice-cages for water-coolers; and it consists in providing the same with bails or handles pivotally secured to the opposite sides of the cage and having a coupling-link whereby the bails are kept horizontally at the top of the cage or above the ice, so as to be readily grasped when desired, said bails being thereby also prevented from dropping and folded within the cage.

Figure 1:
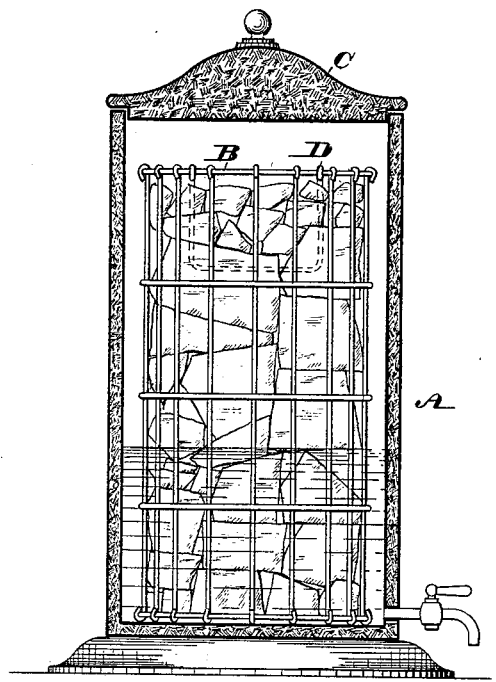
Figure 2:
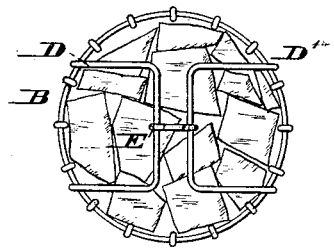
Figure 3:
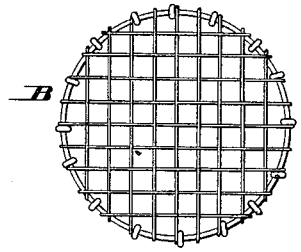

Figure 1 represents a vertical section of a water-cooler with my improved ice-cage in place. Fig. 2 is a top view of the cage or basket. Fig. 3 is a plan view of the bottom thereof.

Similar letters of reference indicate corresponding parts in the several figures.

Referring to the drawings, A represents the cooler having a lid, C; B, the cage, of wire or gauze, filled, as shown, with ice.

D D' are handles pivoted to opposite sides of the top wire of the cage and provided with the link E having hook-shape ends for engagement with the bails, the said links being of such length as to keep the bails in place above the ice at the top of the cage, so that they may be readily grasped when desired to move the cage, without having to insert the hand within the cage or remove any part of the ice from the cage.

The link or hook E may be removed when it is desired to renew the ice.

It will be seen that with this device the ice can be broken up and the cage filled, and it can be worked without handling the ice. It is then lowered gently into place in the cooler and the handles hooked together, as shown.

Having thus described my invention, what I claim as new, and desire to secure by Letters Patent, is—

An ice cage for water coolers, consisting of an open-work body with inwardly-folding handles or bails connected with opposite sides thereof, and a link coupling said handles and retaining them above the top of the ice, substantially as described.

EDWIN P. BENNETT.

Witnesses:
    THEO. C. WARNER,
    HARRY SMITH.